Dec. 16, 1941.   H. B. COPEMAN   2,266,007
ICE TRAY
Filed Feb. 17, 1937   4 Sheets-Sheet 1

INVENTOR.
Hazel B. Copeman
BY
Barnes, Kisselle, Laughlin & Raisch
ATTORNEYS.

Dec. 16, 1941.  H. B. COPEMAN  2,266,007
ICE TRAY
Filed Feb. 17, 1937  4 Sheets-Sheet 2

INVENTOR.
Hazel B. Copeman
BY
Barnes, Kisselle, Laughlin & Keuch
ATTORNEYS

Dec. 16, 1941.  H. B. COPEMAN  2,266,007
ICE TRAY
Filed Feb. 17, 1937  4 Sheets—Sheet 3

INVENTOR.
Hazel B. Copeman
BY
Barnes, Kisselle, Laughlin & Raisch
ATTORNEYS

Dec. 16, 1941.  H. B. COPEMAN  2,266,007
ICE TRAY
Filed Feb. 17, 1937  4 Sheets-Sheet 4
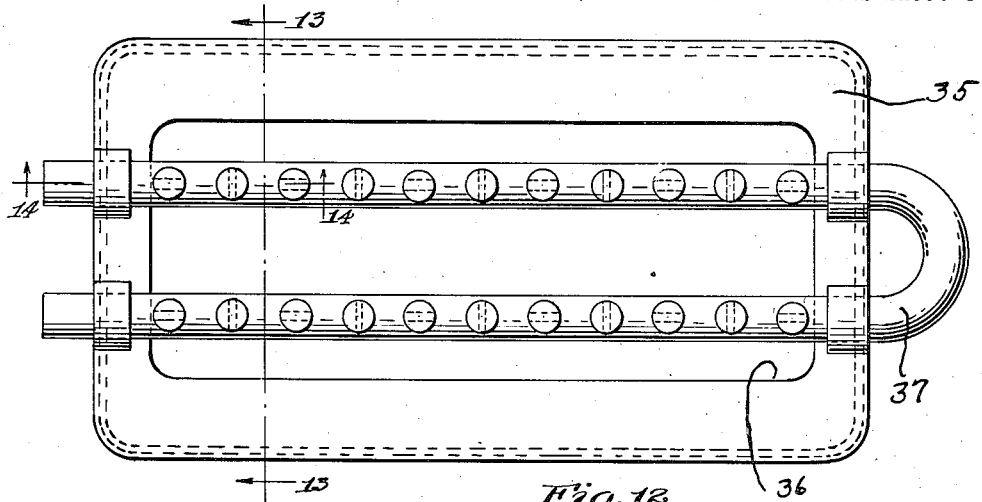
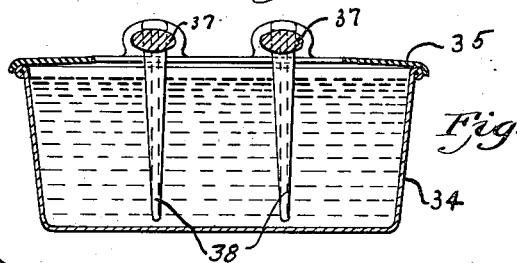
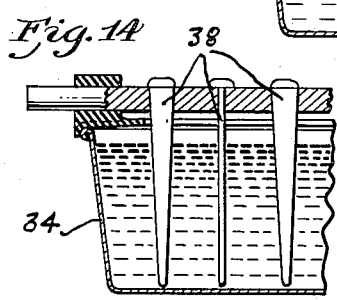
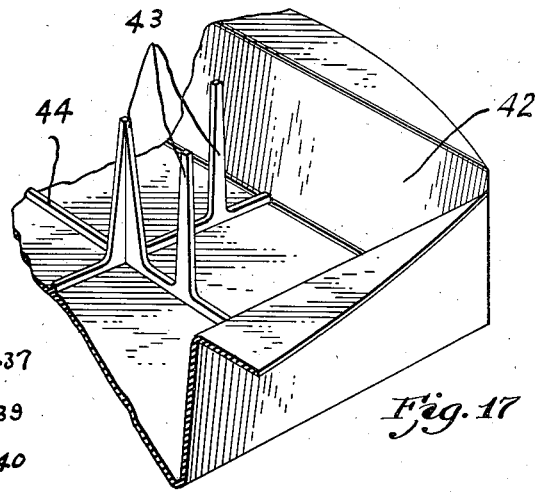
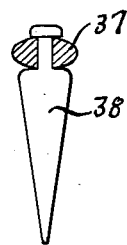
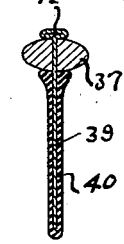
INVENTOR.
Hazel B. Copeman
BY
Barnes, Kisselle, Laughlin & Raisch
ATTORNEYS Patented Dec. 16, 1941

2,266,007

UNITED STATES PATENT OFFICE 2,266,007

ICE TRAY

Hazel B. Copeman, Flint, Mich., assignor to Copeman Laboratories Company, Flint, Mich., a corporation of Michigan Application February 17, 1937, Serial No. 126,142

11 Claims. (Cl. 62—108.5)

This invention relates to ice trays which are adapted to be placed in the freezing compartment of domestic refrigerators of the mechanical or gas type.

In the prior art related to trays for freezing ice in domestic refrigerators, the tendency has been to design trays which form a large number of ice cubes. Many trays have been designed which embody devices and means for removing ice cubes, such as rubber trays and flexible metal trays or trays having flexible covers thereon, but these have either proved to be inconvenient or have resulted in a lengthening of the freezing time due to the low conductivity of rubber or due to the covering of the tray.

The object of the present invention is to provide an ice tray which avoids forming a large number of ice cubes. The present invention contemplates a tray of the type that will freeze water contained therein in a very short freezing time to form a large block of ice, said tray containing means for forming the block of ice so that it may be easily broken up into small blocks or cubes for use or storage of the same.

More specifically the invention relates to the freezing of the complete block of ice in a very short time and scoring or perforating the block as it is frozen so as to make it easy to break the block into small regular portions of ice when desired.

The invention further contemplates a means for removing the entire ice tray from the refrigerator shelf by lining said shelf with a flexible rubber covering.

In the drawings:

Figs. 12, 13 and 14 illustrate a plan view and cross-sections of another assembled embodiment of the invention, this embodiment having members depending into the ice tray for perforating the ice block.

Figs. 15 and 16 illustrate modified forms of the depending members.

Fig. 17 illustrates a member which embodies the ribs of Fig. 9 and the depending members of Fig. 12 arranged in upwardly projecting relation. This member may be used as a tray lining, when formed of rubber, or as an ice block breaker, when formed of metal.

Figure 1:
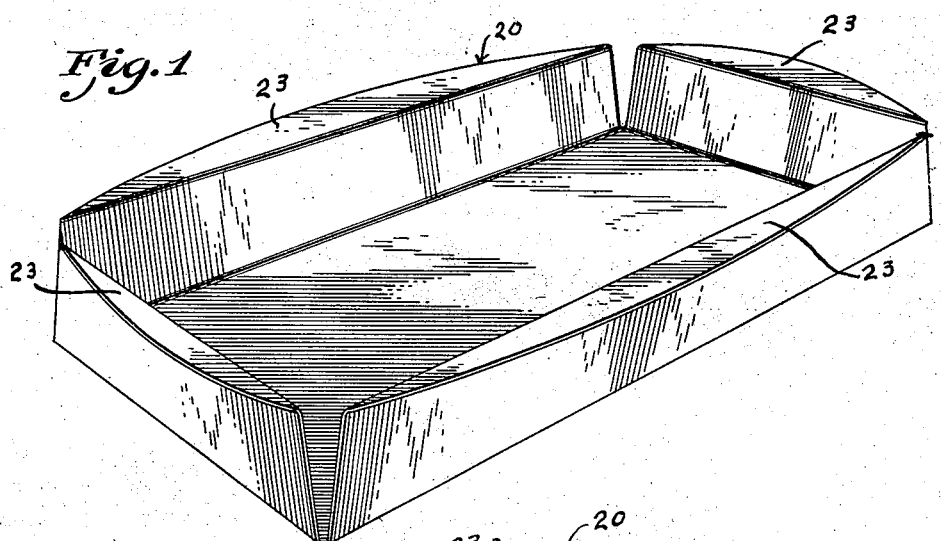
Fig. 1 represents a flexible rubber tray lining having independent sides disconnected at the corners.
Figure 2:
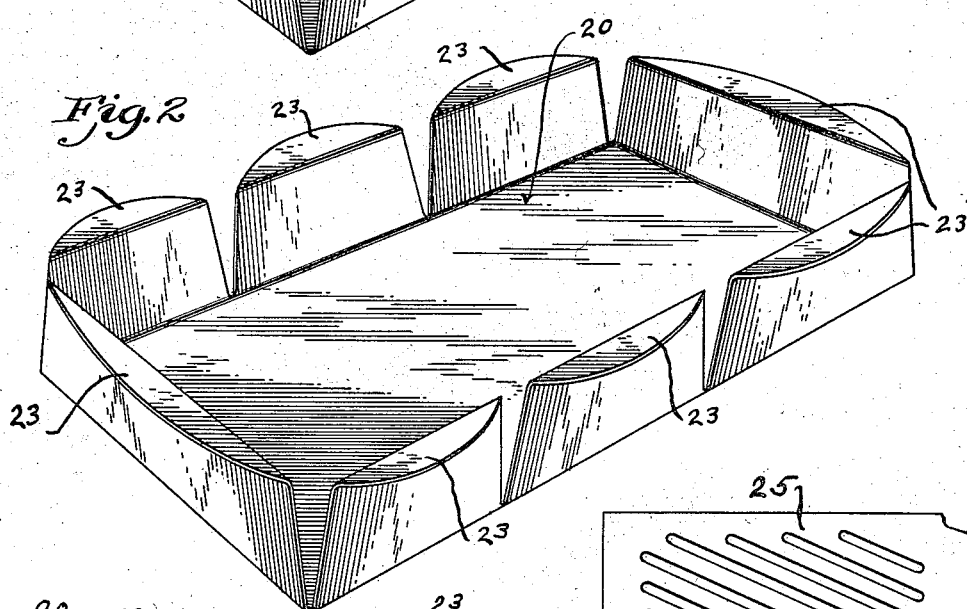
Fig. 2 illustrates a similar flexible rubber tray lining having its longer sides divided into three independent side walls or portions.
Figure 3:
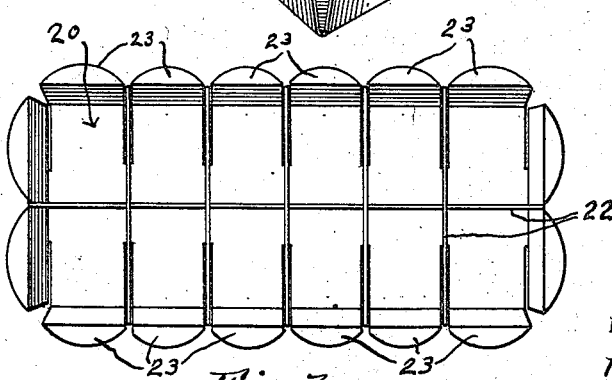
Fig. 3 illustrates a flexible rubber tray lining having its side members and bottom provided with transverse slits at regular intervals, said slits extending about a third of the way in from the edge of the bottom. A metal partition or dividing element is shown positioned in the tray.

In Figs. 1 to 4 is shown a modification of the invention in which a thin flexible rubber tray lining 20 is constructed to fit into a metal tray 21. The sides of this tray lining may extend the entire length of the bottom as shown in Fig. 1 or they may be formed of a number of equally dimensioned side walls as shown in Figs. 2 and 3. These tray liners 20 are held in place in the metal tray 21 by a partition unit or grid 22. This partition unit may have a number of partitions corresponding to the divisions in the side walls of the rubber tray lining as shown particularly in Fig. 3. On each individual side member of the rubber tray liners is preferably formed a soft rubber lip 23 which extends over the side of the metal tray 21 to enable the fingers to clasp the same.

Figure 4:
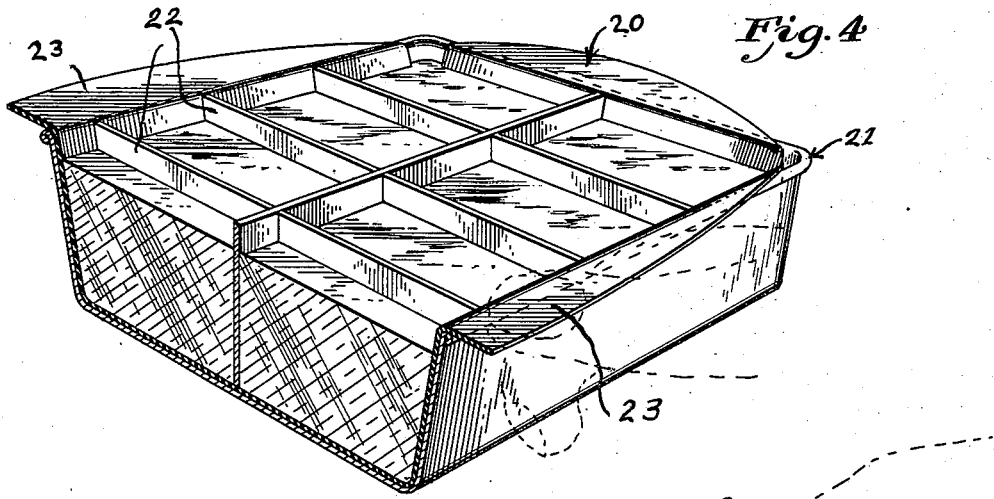
Fig. 4 shows an ice filled rubber tray lining of Fig. 1 positioned in a metal freezing tray and held in place by a partition element.
Figure 5:
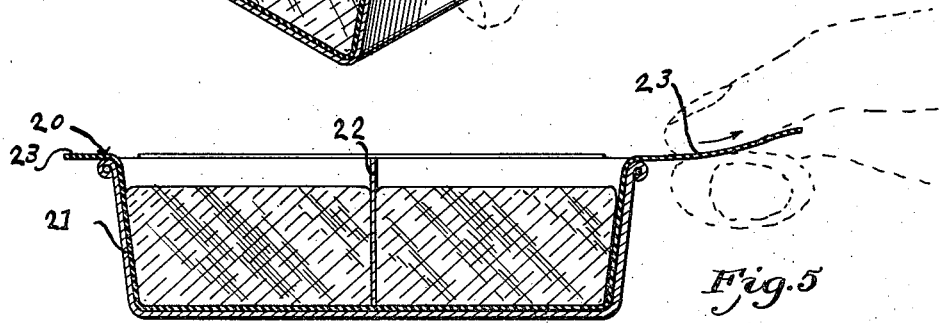
Fig. 5 shows the manner in which a side of the rubber tray lining would be stretched to remove it and the blocks of ice contained therein from the metal tray.

When the assembly shown in Fig. 4 is filled with ice the solid block of ice containing the metal grid 22 may be removed from the metal tray 21 by grasping the lips 23, as shown in Figs. 4 and 5, between the thumb and forefinger, and exerting a pulling or stretching force on the rubber sides of tray lining 20. The result will be that the soft rubber tray lining will decrease in cross-section as it is stretched and will automatically strip itself from the metal tray. The entire tray lining 20 with the partition 22 may be lifted from the metal tray 21. It will then be possible to store the completed ice block with the rubber lining in a storage compartment, or to strip the rubber tray lining 20 therefrom and use the individual cubes for whatever purpose desired. It will be seen that when an ice block is formed in the unit shown in Fig. 3, any desired number of ice cubes could be exposed at any one time by simply stripping any of the individual side portions shown generally at 23. The embodiments shown in Figs. 1 to 3 are especially intended to obtain quick freezing due to the thinness of the rubber lining and the fact that the substance being frozen is open to the atmosphere in the freezing chamber, and because of the fact that a metal partition unit formed of material having high conductivity may be used.

Figure 8:
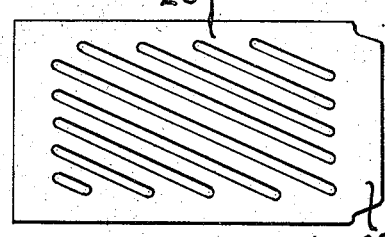
Figs. 6, 7 and 8 illustrate, respectively, the location, manner of operation, and design of the means for removing the metal tray from the refrigerator shelf.
Figure 6:
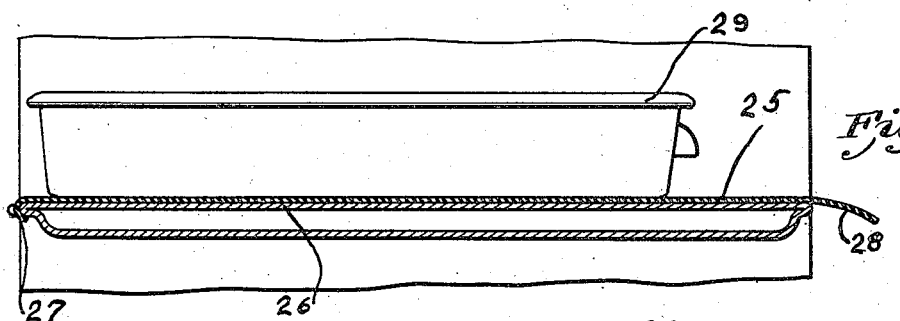
Figure 7:
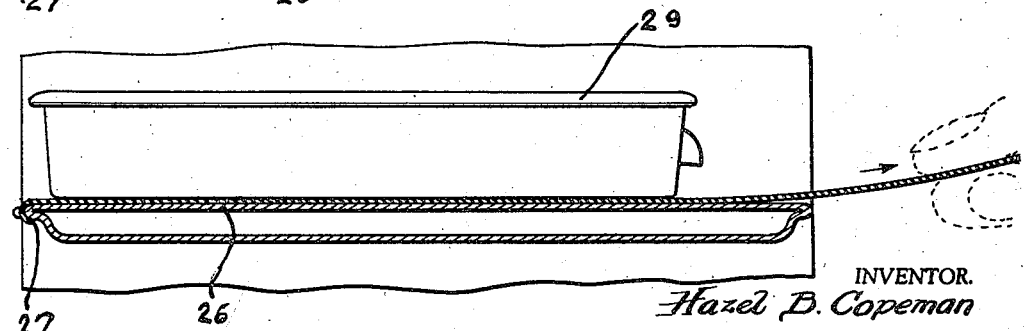

It is common knowledge that frost and water become lodged on the shelves of sharp freezing chambers especially during the defrosting period. Ice is thereby formed between the shelf and the ice tray and serves to hold the tray solidly in place. Many complicated mechanical devices have been proposed to loosen these trays but none of them have been entirely successful. I propose to remove the ice tray from the shelf of the sharp freezing chamber in the same manner as I remove the ice blocks from the ice tray itself. Fig. 8 shows a plan view of a perforated soft rubber mat 25 which will be mounted on a refrigerator shelf 26 shown in Figs. 6 and 7. This flexible rubber mat 25 will be firmly attached to the rear of the shelf 26 as at 27 and is provided with an outwardly extending pull tab 28. An ice tray 29 is shown in position on the shelf 26. When it is desired to remove the tray 29 from the shelf 26 it is necessary only to lift and pull the tab 28 of the soft rubber mat 25 as shown in Fig. 7 thereby stretching it from under the tray. This will decrease the cross-section of the soft rubber and loosen it from the shelf 26 and will also serve to strip the rubber mat 25 from the tray 29. The ice tray 29 may then easily be withdrawn from the freezing chamber.

Figure 9:
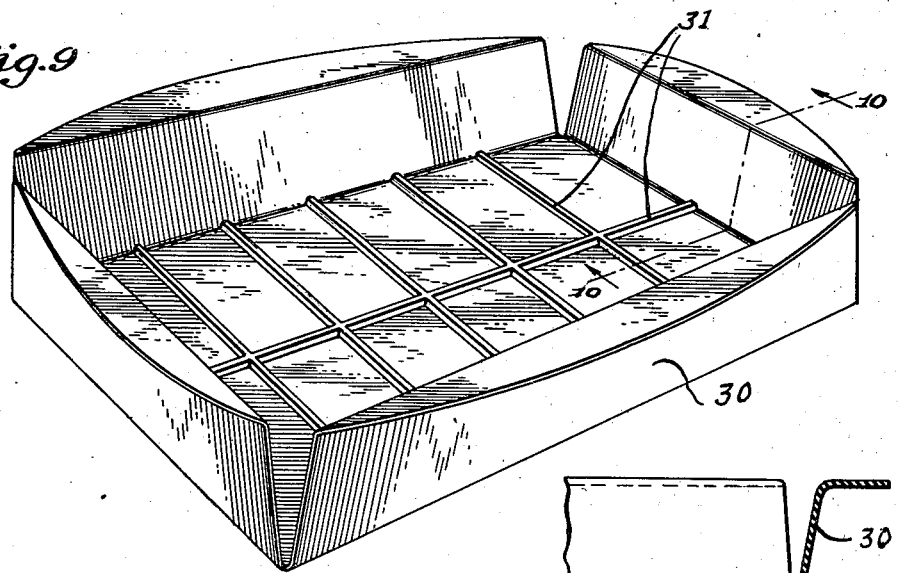
Fig. 9 shows a rubber tray lining similar to that shown in Fig. 1 but having scoring means integral with the inner surface of the bottom of the tray lining for scoring the large ice block as it is formed in the tray.
Figure 10:
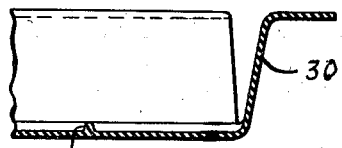
Figs. 10 and 11 show the completed ice block and the manner in which it may be stored in the tray lining before being used.
Figure 11:
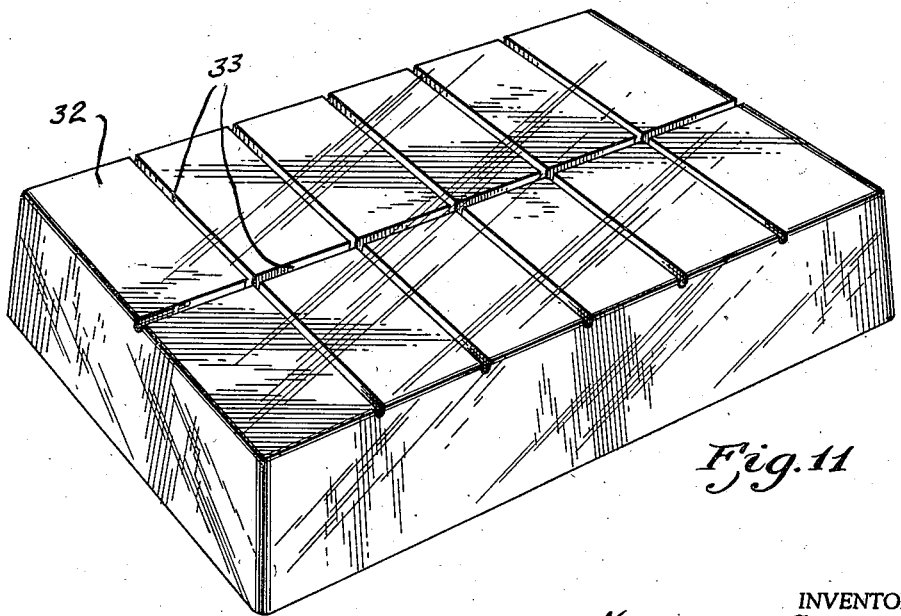

A further modification of the rubber tray lining is shown in Fig. 9 where a soft rubber tray lining 30 has scoring means 31 former integrally with the bottom of the tray lining. These scoring means consist simply of ridges in the bottom of the tray lining spaced to mark out ice cubes of convenient size. This tray lining 30 is held as before, in a metal tray, and serves to form a large block of ice 32, shown in Fig. 11, having the scoring marks 33 on the bottom thereof. This large block of ice 32 would be removed from the metal tray by pulling the lips of the tray lining 30 as previously described with reference to Figs. 1 to 3. It could then be stored in inverted position in the rubber tray lining 30 and would rest on the scoring means 31 so as not to freeze again to the rubber tray lining. Individual ice cubes could be removed from the large ice block 32 by using an ice pick or other sharp instrument. These ridges or scoring means 31 can be made to extend up into the ice any desired distance.

The invention is further illustrated by a modification in which the completed ice block has tapered perforations regularly spaced to mark out the ice cubes. Referring to Figs. 12, 13 and 14 a metal tray 34 supports a cover 35, said cover having a large opening 36 so that the cover 35 amounts to little more than a rim around the top portion of the metal tray 34. The metal tray 34 may be lined with a flexible rubber tray similar to that shown in Fig. 1 or it may be lined with a permanent coating of wax as in the Hathorne Patent No. 1,932,731, dated October 31, 1933. Supported centrally of the cover 35 and rigidly attached thereto is an elongated U-shaped bar 37. This bar has depending rubber projections 38 embedded in it at intervals along the bar and extending downwardly through the opening 36 in the cover 35 substantially to the bottom of the tray 34. These projections are tapered in such a manner that they are wider at the top than at the bottom and may be mounted in the bar 37 in a number of ways. Fig. 15 illustrates an enlarged view showing how the rubber projection 38 is held in the bar 37. Fig. 16 illustrates another method of supporting the projections 38 where the metal pin 39 serves as a core to the rubber projection 40, said pin extending through the bar 37 and being bent as at 41 to hold the same in place. The preferred cross-section of the projections 38 is rectangular since this particular type of projections may be most easily removed from the completed block of ice. It will be noticed that in Fig. 12 the projections 38 are alternately at right angles to each other to more clearly mark out the corner ice cubes that will ultimately be formed from the ice block made in the ice tray 34. Of course, these projections 38 might be held in position in any number of ways, as for example, they might be formed on a flexible rubber cover.

When the tray 34 is filled with water and frozen a large block of ice will be formed. This block of ice may be removed from the tray 34 either by running hot water over the tray or by pulling on the flexible rubber tray lining if one has been provided. The bar 37 may then be lifted away from the large ice block, and this lifting force will strip the rubber projections 38 from their places in the ice. It will be understood that these rubber projections, when pulled, will reduce in cross-section from the top down and strip themselves from the ice thus permitting an easy removal of the same. The result will be a large ice block that has perforations at regular intervals in the ice. Ice cubes may be formed from this large ice block either by the use of an ice pick or by placing said complete ice block in a metal tray, similar in part to the lining shown in Fig. 17, and in which there are upwardly projecting metal prongs located to exactly coincide with the perforations in the ice block. By making these prongs of slightly larger dimensions than the rubber projections 38 and the corresponding holes or perforations in the ice block, the ice block may be broken into cubes by placing it in such metal tray and exerting a sharp downward pressure on the ice.

As previously indicated with reference to Fig. 17, the tray lining 42 shown therein may be formed of either rubber or metal and, when formed of rubber, will have rubber prongs 43 projecting upwardly from scoring means 44 in the bottom of the tray lining, said prongs 43 being of sufficient stiffness that they will stand erect. This tray lining 42 will then aid in forming an ice block which will have perforations as well as being scored, thereby facilitating the breaking of the large ice block into small ice cubes. With this embodiment a metal storage tray could also be used as indicated in the preceding paragraph. The metal projections 43 would again be slightly larger than the rubber projections which form the perforations in the ice, so that pressure on the large ice block after it is fitted into the storage chamber would break it into ice cubes.

What I claim is:

1. The combination with a tray of good heat conducting properties for containing a substance to be congealed or frozen and adapted to be placed in a sharp freezing chamber, of a soft rubber lining member removably arranged in the tray in position to separate said tray from a substance to be frozen and having spaced transverse slits in its sides and bottom to form sides composed of a number of adjacent separated members, and an ice grid removably positioned within said lining member having cross grids spaced to register with said slits in the sides of said lining member, said lining member being adapted to loosen said frozen substance from said tray when its sides are stretched from normal shape.

2. The combination with a tray for containing a substance to be congealed or frozen and adapted to be placed in a sharp freezing chamber, of a substantially thin soft rubber lining member removably arranged in the tray in position to separate said tray from a substance to be frozen, and projections on said lining member for extending into said substance to be frozen to form breaking grooves in said substance when frozen, said projections having a height less than the depth of said tray.

3. The combination with a tray for containing a substance to be congealed or frozen and adapted to be placed in a sharp freezing chamber, of a substantially thin soft rubber lining member removably arranged in the tray in position to separate said tray from a substance to be frozen, and scoring projections on said lining member for extending partially through said substance to be frozen to form breaking grooves in said substance when frozen.

4. The combination with a tray for containing a substance to be congealed or frozen and adapted to be placed in a sharp freezing chamber, of a substantially thin soft rubber lining member removably arranged in the tray in position to separate said tray from a substance to be frozen, and spaced vertical projections on the bottom of said lining member for extending into said substance to be frozen to form perforations therein when frozen.

5. The combination with a tray having a bottom and sidewalls for containing a substance to be congealed or frozen and adapted to be placed in a sharp freezing chamber, of a substantially thin soft rubber lining member removably arranged in the tray in position to separate said tray from a substance to be frozen, and spaced substantially vertical prong-like upright projections on the bottom of said lining member having a length substantially equal to the height of the sidewalls of said tray for marking out and facilitating the formation of cubes of said substance to be frozen, said lining member being adapted to loosen said tray from said frozen substance when stretched to a point where its cross-section is reduced.

6. The combination with a tray for containing a substance to be congealed or frozen and adapted to be placed in a sharp freezing chamber of a substantially thin soft rubber lining member removably arranged in the tray in position to separate said tray from a substance to be frozen, and unconnected spaced prong-like projections on said lining member for extending into said substance to be frozen to form perforations therein when the substance is frozen, said lining member being adapted to loosen said tray from said frozen substance when stretched to a point where its cross-section is reduced.

7. The combination with a flat bottom tray for containing a substance to be congealed or frozen and adapted to be placed in a sharp freezing chamber, of a substantially thin soft rubber lining member removably arranged in the tray in position to separate said tray from a substance to be frozen, and scoring projections on said lining member for extending partially through said substance to be frozen to form breaking grooves in said substance when frozen, said lining member being adapted to loosen said tray from said frozen substance when stretched to a point where its cross-section is reduced.

8. The combination with a flat bottom tray for containing a substance to be congealed or frozen and adapted to be placed in a sharp freezing chamber, of a substantially thin soft rubber lining member removably arranged in the tray in position to separate said tray from a substance to be frozen, and spaced projections on said lining member for extending into said substance to form breaking perforations and grooves in said substance when frozen, said projections comprising transverse and longitudinal ridges on the bottom of said lining adapted to extend partially into said substance to be frozen, and prong-like projections spaced on said ridges adapted to extend substantially through said substance to be frozen.

9. The combination with a tray for containing a substance to be congealed or frozen and adapted to be placed in a sharp freezing chamber, of a flexible lining member for said tray having spaced projections for extending into the substance to be frozen to define breaking depressions in said substance when frozen, said projections being so arranged that the greater portion of the substance to be frozen will form in a solid block.

10. The combination with a tray having a substantially flat bottom for containing a substance to be congealed or frozen and adapted to be placed in a sharp freezing chamber, of a substantially thin soft rubber lining removably arranged in the tray in position to separate the substance to be frozen from the walls of the tray and to be substantially confined between the tray and substance when frozen, said lining comprising a bottom piece and substantially vertical, independent side walls on each side of said bottom, each connected to said bottom but not to each other, and adapted to loosen said tray from said frozen substance when stretched to a point where its cross-section is reduced.

11. The combination with a tray of good heat conducting properties for containing a substance to be congealed or frozen and adapted to be placed in a sharp freezing chamber, of a soft rubber lining member removably arranged in the tray in position to separate said tray from a substance to be frozen, and an ice grid for said tray removably positioned within the lining member and adapted to hold said lining member in place prior to the freezing and arranged to cooperate with said lining member to form ice cube compartments within the tray, said lining member having a portion extending above the tray and adapted to be grasped to distort at least a portion of the lining member, said lining member being adapted to loosen said tray from said frozen substance and said grid when distorted from its normal shape.

HAZEL B. COPEMAN.